(12) United States Patent
Nanaumi

(10) Patent No.: US 9,710,676 B2
(45) Date of Patent: Jul. 18, 2017

(54) DATA PROCESSING APPARATUS, INFORMATION PROCESSING APPARATUS, AND STORAGE MEDIUM

(75) Inventor: Yoshihito Nanaumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 577 days.

(21) Appl. No.: 12/614,809

(22) Filed: Nov. 9, 2009

(65) Prior Publication Data

US 2010/0132035 A1 May 27, 2010

(30) Foreign Application Priority Data

Nov. 7, 2008 (JP) ................. 2008-286256

(51) Int. Cl.
G06F 21/82 (2013.01)
G06F 21/31 (2013.01)
G06F 21/12 (2013.01)

(52) U.S. Cl.
CPC ............ G06F 21/82 (2013.01); G06F 21/121 (2013.01); G06F 21/31 (2013.01)

(58) Field of Classification Search
CPC ......... G06F 21/31; G06F 21/82; G06F 21/121
USPC .......................................... 726/19–20, 8–10
See application file for complete search history.

(56) References Cited

U.S. PATENT DOCUMENTS 8,060,821 B2 * 11/2011 Seymour et al. ............. 715/711
8,060,921 B2 * 11/2011 Lovat ................... G06Q 20/206
  358/1.15
2005/0183141 A1 * 8/2005 Sawada .................. G03G 21/04
  726/16
2006/0126100 A1 * 6/2006 Jung ............................ 358/1.14
2007/0067627 A1 * 3/2007 Dokuni .......................... 713/168
2007/0288996 A1 * 12/2007 Mizuno ................. G06F 21/608
  726/4
2007/0297666 A1 * 12/2007 Takeuchi ............... H04L 67/02
  382/155
2008/0304660 A1 * 12/2008 Sawayanagi et al. .......... 380/44

FOREIGN PATENT DOCUMENTS

| JP | 10-177548 A | 6/1998 |
|---|---|---|
| JP | 2000-106552 A | 4/2000 |
| JP | 2003-242113 A | 8/2003 |
| JP | 2008-003834 A | 1/2008 |

OTHER PUBLICATIONS

English translation of Japanese Office Action dated Dec. 4, 2012, issued for corresponding Japanese Patent Application No. 2008-286256.

* cited by examiner

Primary Examiner — Robert Leung
Assistant Examiner — Carlos M De Jesus Lassala
(74) Attorney, Agent, or Firm — Rossi, Kimms & McDowell LLP

(57) ABSTRACT

In a case where a processing request corresponding to an instruction transmitted from a data processing apparatus is accepted from an external apparatus, an appropriate processing based on a processing request corresponding to an instruction made by a user who operates the data processing apparatus is performed.

11 Claims, 14 Drawing Sheets

FIG.9

| | Attribute | Datatype | |
|---|---|---|---|
| 901 | | | 902 |
| 903 | AuthSvcType | int | |
| 904 | AuthSerIP | varchar(256) | |
| 905 | SecurityToken | binary | |
| 906 | UserName | varchar(256) | |
| 907 | UserID | varchar(256) | |
| 908 | GroupName | varchar(256) | |
| 909 | GroupID | varchar(256) | |
| 910 | DomainName | varchar(256) | |
| 911 | Email | varchar(256) | |
| 912 | AccessRight | binary | |

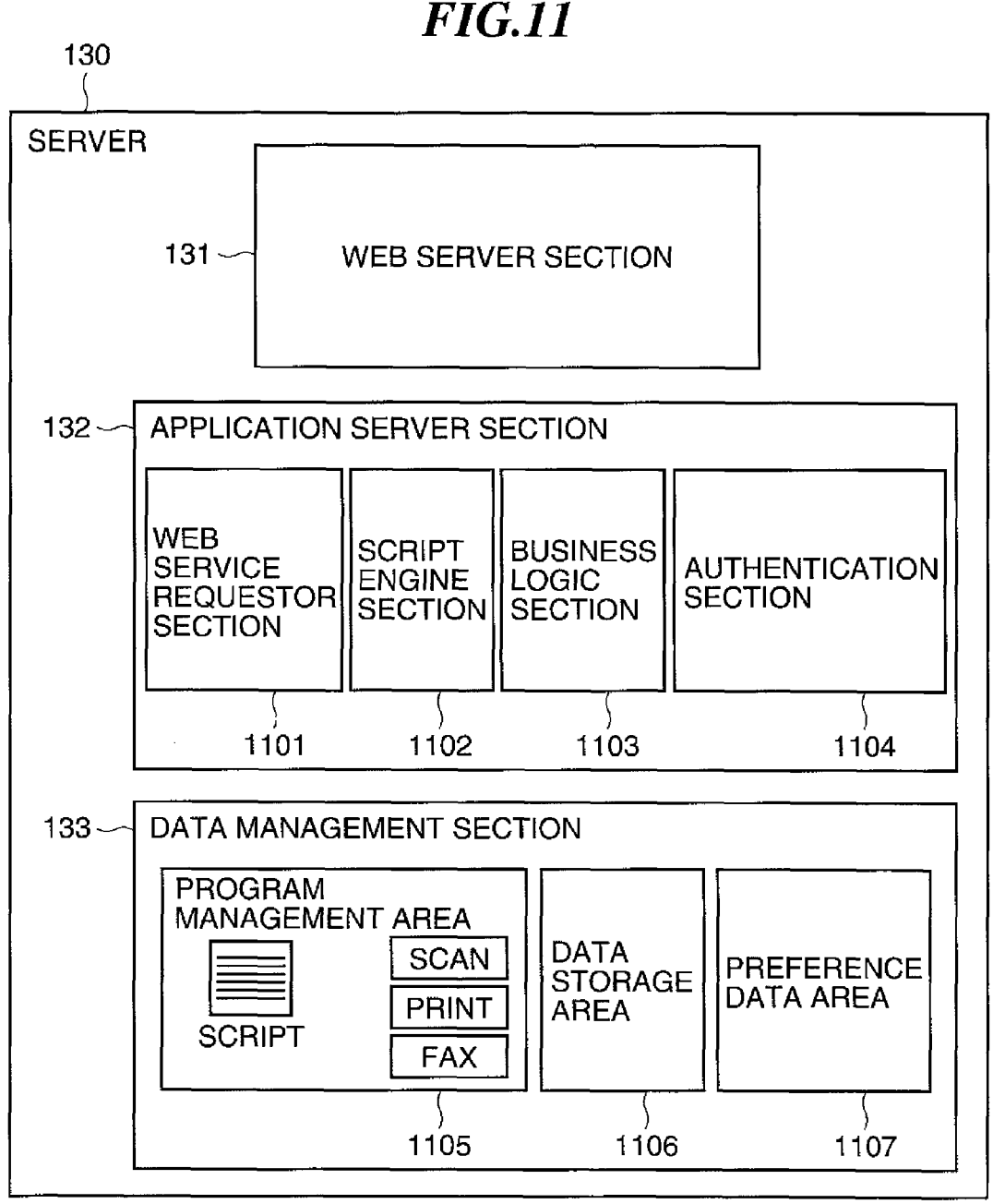

DATA PROCESSING APPARATUS, INFORMATION PROCESSING APPARATUS, AND STORAGE MEDIUM

BACKGROUND OF THE INVENTION

Field of the Invention

The present invention relates to a data processing apparatus, an information processing apparatus, and a storage medium.

Description of the Related Art

In these days, there are generally known data processing apparatuses, each of which has various units housed in a single housing thereof, functioning as a printer, a copier, a facsimile, a scanner, etc. Such data processing apparatuses are called Multi Function Peripherals (MFPs). Such a data processing apparatus has a display, a printing, and/or an imaging section in a single housing as well as applications corresponding to a printer, a copier, a facsimile, and a scanner, respectively.

The data processing apparatus realizes a printer, a copier, a scanner, or a facsimile function while changing an application to be used.

The data processing apparatus includes a browser as a web client function and also a function of obtaining (or downloading) various contents from a remotely located web server.

Furthermore, there is known a method of implementing a user interface for operating a data processing apparatus in an external apparatus, such as a web server, to utilize the user interface by means of a browser of the data processing apparatus.

An instruction given from a browser of a conventional data processing apparatus via an external apparatus, such as a web server, using such a method is accepted by the data processing apparatus as a processing request (e.g., a web service request) from outside.

Some of such data processing apparatuses execute only processing requests (e.g., both information and a printing request) from legitimate web servers through exchange of information that identifies a web server (e.g., a host name), for example, between the data processing apparatus and the web server (see Japanese Laid-Open Patent Publication (Kokai) No. 2008-003834).

However, in the technique of Japanese Laid-Open Patent Publication (Kokai) No. 2008-003834, it is determined whether or not to execute a processing based on the information from the web server; accordingly, a processing request from the web server would be unfavorably accepted so long as the request is legitimate even if the request is not from a user who is operating the data processing apparatus.

By way of example, suppose that a malicious user accesses the above-mentioned web server and transmits a processing request from the web server to the data processing apparatus. In that case, the data processing apparatus unfavorably executes a processing not desired by the user who is operating the data processing apparatus based on the processing request from the web server. Specifically, if the data processing apparatus accepts a scan request made by a third party from the web server while the user makes settings for scanning, with a document put on the scanner of the data processing apparatus, reading of the document that is not ordered by the user may be started.

Such a situation can occur even for a legitimate user who is authorized to utilize the data processing apparatus and/or the web server besides a malicious user. For example, assume that a user other than the one who is operating the data processing apparatus accesses the above-mentioned web server and transmits a processing request from the web server to the data processing apparatus. Also in that case, processing not desired by the operating user may be carried out.

SUMMARY OF THE INVENTION

According to an aspect of the present invention, there is provided with the a data processing apparatus connected with an external apparatus via a network, the data processing apparatus comprising: a display unit configured to obtain and display an operation screen provided in the external apparatus; an input unit configured to accept an instruction from a user via the operation screen displayed by the display unit; an instruction transmitting unit configured to transmit the instruction accepted by the input unit to the external apparatus; a generating unit configured to generate authentication information in a case where authentication of the user based on user information on the user who operates the data processing apparatus has been successful; a storing unit configured to store the authentication information generated by the generating unit; an authentication information transmitting unit configured to transmit the authentication information generated by the generating unit to the external apparatus; a receiving unit configured to receive from the external apparatus a processing request corresponding to the instruction transmitted by the instruction transmitting unit to the external apparatus and the authentication information generated by the generating unit; and a control unit configured to provide control so as not to execute a processing based on the processing request corresponding to the instruction transmitted by the transmitting unit to the external apparatus in a case where authentication based on the authentication information received by the receiving unit and the authentication information stored in the storing unit has not been successful.

Further features of the present invention will become apparent from the following descriptions of exemplary embodiments with reference to the attached drawings.

BRIEF DESCRIPTION OF THE DRAWINGS

FIG. 9 is a view which is useful in explaining a data structure of an authentication context created and managed by an ACM 206 shown in FIG. 2.

FIG. 11 is a block diagram showing a detailed configuration of a server 130 shown in FIG. 1.

DESCRIPTION OF THE EMBODIMENTS

A description will be given of a best mode for implementing the present invention, with reference to drawings.

Description of System Configuration

First Embodiment

Figure 1:
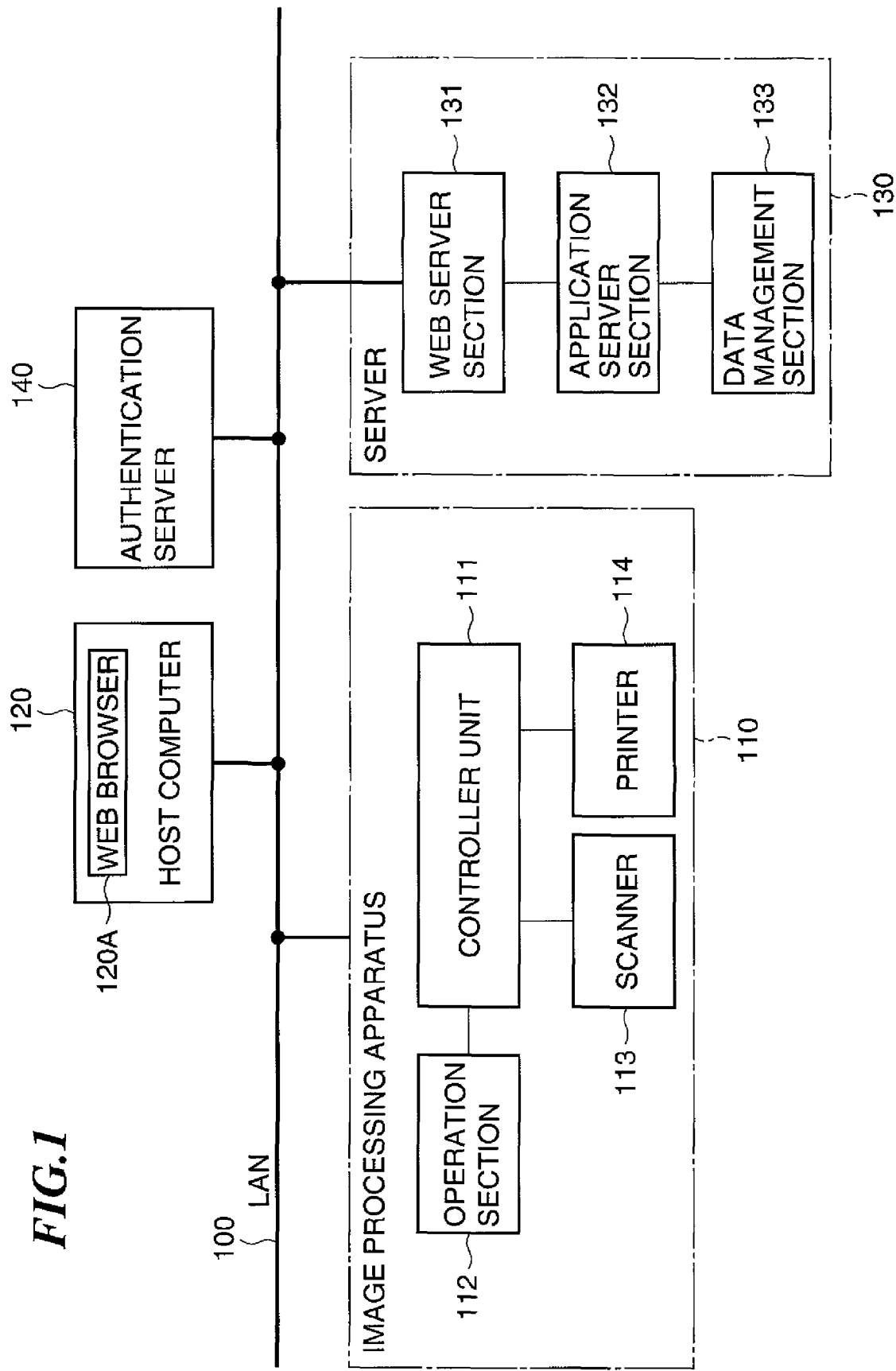
FIG. 1 is a block diagram showing an example of an image processing system including an image processing apparatus according to an embodiment of the present invention.

FIG. 1 is a block diagram showing an example of an image processing system including an image processing apparatus according to the present embodiment. It should be noted that the present embodiment is described with an image processing apparatus as a data processing apparatus and with an image processing system as an example of a data processing system. The present embodiment is directed to an example of a system comprising an image processing apparatus, a server, an authentication server and so forth are connected with one another via a network, in which the server serving as an information processing apparatus exchanges information with an image processing apparatus. It should be noted that the authentication server may also be disposed in an image processing apparatus 110 or a server 130, in which case an authentication server need not be disposed on the network. The present invention is described assuming that a local authentication process and a web authentication process are performed by utilizing the authentication server. In addition, while the image processing apparatus shown in the present embodiment is a so-called Multi Function Peripheral (MFP), it may be a Single Function Peripheral (SFP).

In FIG. 1, reference numeral 100 denotes a Local Area Network (LAN), which is connected to a Wide Area Network (WAN) and/or the Internet.

A host computer 120 is connected to the LAN 100. The host computer 120 has a web browser 120A installed thereon, which enables to make an HTTP connection to the image processing apparatus 110 and the server 130 via the LAN 100 to thereby receive services from them.

The host computer 120 includes a personal computer (PC), a Personal Digital Assistant (PDA) or a cellular phone, for example.

On the server 130, the following software modules are installed as software processes for realizing a web application server.

In this present embodiment, software modules possessed by the server 130 include a web server section 131, an application server section 132, and a data management section 133. The server 130 can be accessed by a plurality of apparatuses on the network and those apparatuses can utilize functions of the server 130. For example, the server 130 is accessed by the host computer 120 and the image processing apparatus 110, or other apparatuses (not shown) which are connected to the network, and these apparatus can utilize functions of the server 130.

The web server section 131 transmits contents in HTML or the like in response to a request by an HTTP protocol from a client. The application server section 132 performs predetermined processings and makes a dynamically varying HTTP response for an HTTP request. The application server section 132 is implemented in the form of a Common Gateway Interface (CGI) program or a Servlet. The data management section 133 stores script data which is called by the application server section 132 and/or stores received data.

An authentication server 140 performs user authentication and user information management. Specifically, the authentication server 140 performs user authentication using a Credential, such as a user name, a domain name, and a password, from the image processing apparatus 110 and the server 130 which are connected to the LAN 100. Upon success in the user authentication, the authentication server 140 sends back a Security Token (hereinafter referred to as "the ST") to the authentication requestor resource.

Here, the Credential is directed to credit information of a user necessary for user authentication, referring to a user name, a domain name, or a password, for instance. The ST is directed to information that is returned to the authentication request resource when the Credential has been confirmed to be legitimate with successful user authentication, for indicating that the user has been authenticated.

Among apparatuses subjected to the user authentication by the authentication server 140, use of the ST eliminates the need for undergoing the Credential-based user authentication again. With the authentication server 140, it is possible to uniformly perform the user authentication can be performed among the apparatuses connected to the LAN 100 and further uniquely identify the users among the apparatus.

The image processing apparatus 110 is a Multi Function Peripheral that performs input/output and transmission/reception of images as well as various types of image processings.

The image processing apparatus 110 includes a scanner 113 as an image input device, a printer 114 as an image output device, a controller unit 111, and an operation section 112.

The scanner 113, the printer 114, and the operation section 112 are connected to the controller unit 111, respectively, and controlled according to instructions from the controller unit 111. The controller unit 111 is connected to the LAN 100.

Software Configuration of Image Processing Apparatus 110

A description will be given of a software configuration of the image processing apparatus 110, with reference to FIG. 2.

Figure 2:
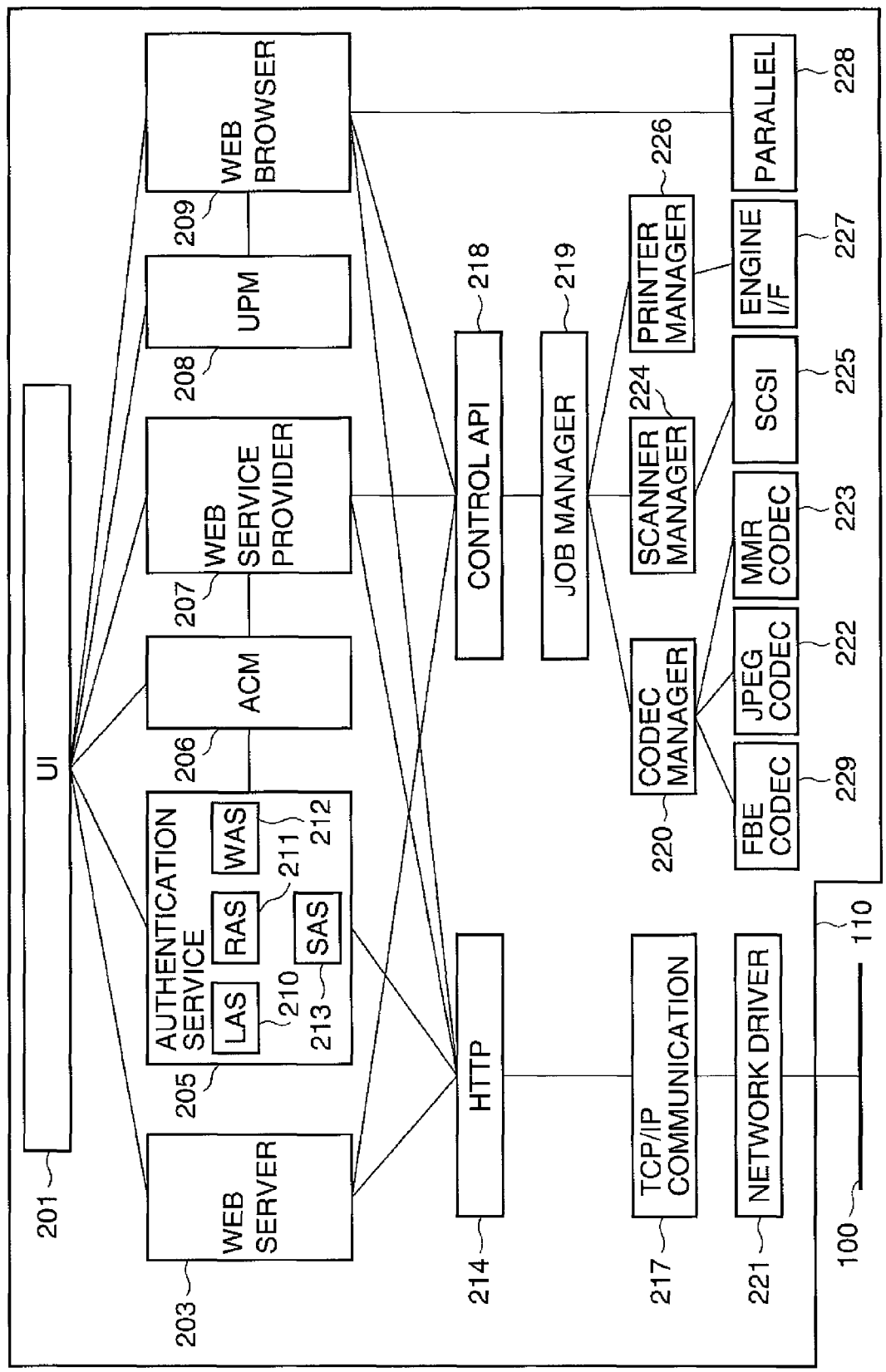
FIG. 2 is a block diagram showing a software configuration of an image processing apparatus 110 shown in FIG. 1.

FIG. 2 is a block diagram showing a software configuration of the image processing apparatus 110 shown in FIG. 1.

In FIG. 2, a user interface (hereinafter referred to as "the UI") module 201 is directed to a module that intervenes between the apparatus and the user operations when the operator performs various kinds of operations or makes settings for the image processing apparatus 110.

The UI module 201 transfers input information to various kinds of modules described below to request a processing or set data in accordance with the operator's manipulations.

A web server module 203 accepts an HTTP request from a web client (e.g., the host computer 120). Hereinafter, the web server module 203 will be abbreviated as the web server 203.

The web server 203 responds to the HTTP request from the web client using HTTP via an HTTP module 214, a TCP/IP communication module 217, and a network driver 221. In this instance, contents to be responded include management information for the image processing apparatus 110 and the like.

The web browser module 209 loads and displays various kinds of web pages on the Internet or an intranet. Hereinafter, the web browser module 209 will be abbreviated as the web browser 209, a detailed configuration of which will be described later.

The HTTP module 214 is used when the image processing apparatus 110 performs HTTP communication. The HTTP module 214 provides communication functions to the web server 203, the web browser 209, and a web-service provider module 207, which is described below, using the TCP/IP communication module 217 described below.

The HTTP module 214 also provides communication functions using various kinds of protocols used on the web, including HTTP, especially a security-enabled protocol.

The TCP/IP communication module 217 provides the aforementioned various kinds of modules with network communication functions using the network driver 221. The network driver 221 is physically connected to a network to control data input and output.

An authentication service module 205 manages and controls a user authentication process for the user to utilize functions of the image processing apparatuses.

A local authentication service (LAS) module 210 manages and controls an authentication process for user authentication that is performed from the UI module 201. Hereinafter, the local authentication service (LAS) module 100 will be abbreviated as the LAS 210.

Upon receiving the Credentials input from the UI module 201, the LAS 210 performs the authentication process with the authentication server 140.

A data communication protocol for the user authentication and/or Credentials required for the user authentication vary depending on the authentication method used on the authentication server 140. For this reason, the LAS 210 is replaceable and hence replacement of the LAS 210 enables to support various kinds of authentication methods of the authentication server 140. In this instance, the authentication methods may include NTLM authentication and Kerberos authentication, for instance. Replacement of the LAS 210 also enables a simple authentication service module 213 in the image processing apparatus 110 to perform authentication instead of the authentication server 140. Hereinafter, the simple authentication service module 213 will be abbreviated as "the SAS 213".

Furthermore, replacement of the LAS 210 realizes various ways of accepting an input, such as input of authentication information through a touch panel or a soft keyboard as well as input of a Credential from a USB keyboard or a USB card reader.

A remote authentication service (RAS) module 211 manages and controls an authentication process for user authentication that is performed from a web client via the web server module 203. Hereinafter, the remote authentication service (RAS) module 211 will be abbreviated as "the RAS 211".

Upon receiving the Credentials from the web server 203, the RAS 211 performs an authentication process with the authentication server 140. The RAS 211 is also replaceable as is the case with the LAS 210, and hence replacement of the LAS 210 enables to support various kinds of authentication methods of the authentication server 140.

A web service authentication (WAS) module 212 manages and controls an authentication process for utilizing functions of the image processing apparatus by way of the web service provider module 207 discussed below. Hereinafter, the web service authentication (WAS) module 212 will be abbreviated as "the WAS 212".

The WAS 212 publishes on the network an interface for an authentication process as a web service.

An authentication context management (ACM) module 206 manages the ST that is returned from the authentication server 140 after the user authentication has been completed and user information that can be obtained from the authentication server 140. Hereinafter, the authentication context management (ACM) module 206 will be abbreviated as "the ACM 206". The ACM 206 will be described in more detail later.

The web service provider module 207 provides device functions as a web service. The web-service provider module 207 interprets and executes a command received via the LAN 100. As such a command may include a SOAP command, for example. Hereinafter, the web service provider module 207 will be abbreviated as "the WSP 207".

A user profile management (UPM) module 208 manages users' setting and management information on a user-by-user basis. Hereinafter, the user profile management (UPM) module 208 will be abbreviated as "the UPM 208". The UPM 208 requires the ST in order to obtain setting information and acquires each user's setting information with the ST as an access key.

A simple authentication service (SAS) module 213 is directed to a module that is responsible for user authentication and user information management within the image processing apparatus 110.

As described above, the authentication service module 205 causes the authentication server 140 to perform an authentication service with one of the LAS 210, the RAS 211, and the WAS 212 selected. The authentication service module 205 also can cause the simple authentication service (SAS) module 213 other than the LAS 210, the RAS 211, and the WAS 212 to perform the authentication service.

A control API 218 provides higher-level modules, such as the web server 203, the web browser 209, and the WSP 207, with an interface with lower-level modules, such as a job manager 219. This reduces dependencies among higher- and lower-level modules to improve their respective reusabilities. Hereinafter, the job manager module 218 will be abbreviated as "the job manager 218".

The job manager 219 interprets various types of processings specified by the aforementioned various kinds of modules via the control API 218 and gives instructions to modules 220, 224 and 226 described below. The job manager 219 also unifies management of hardware-based processings that are executed in the image processing apparatus 110.

A CODEC manager module 220 manages and controls various ways of data compression and decompression in the course of processing specified by the job manager 219. Hereinafter, the CODEC manager module 220 will be abbreviated as "the CODEC manager 220".

An FBE encoder module 229 compresses data read through a scanning process using an FBE format. Specifically, the FBE encoder module 229 compresses, using the FBE format, data read through the scanning process executed by the job manager 219 or a scan manager 224 discussed below.

A JPEG CODEC 222 JPEG-compresses the read data and JPEG-decompresses printing data.

In this instance, the read data is directed to data that is generated based on a scanning process executed by the job manager 219 or the scanner manager 224, and the printing data refers to data that is prepared based on a printing process executed by a print manager 226.

An MMR CODEC module 223 performs compression of read-in data and decompression of printing data according to MMR. Here, the read data includes data that is generated based on scanning executed by the job manager 219 or scanner manager 224, and the printing data includes data that is based on printing executed by the print manager 226.

The scanner manager 224 manages and controls a scanning process specified by the job manager 219. The scanner manager 224 and the scanner 113 internally connected in the image processing apparatus 110 are communicated with each other by way of a SCSI driver 225.

The print manager 226 manages and controls a printing process specified by the job manager 219. An interface between the print manager 226 and the printer 114 is provided by an engine I/F 227.

A parallel port driver (Parallel) 228 is also included for providing an I/F for outputting data to an output device not shown via the Parallel 228.

Detailed Configuration of Image Processing Apparatus 110

A description will be given of a configuration of the image processing apparatus 110, with reference to FIG. 3.

Figure 3:
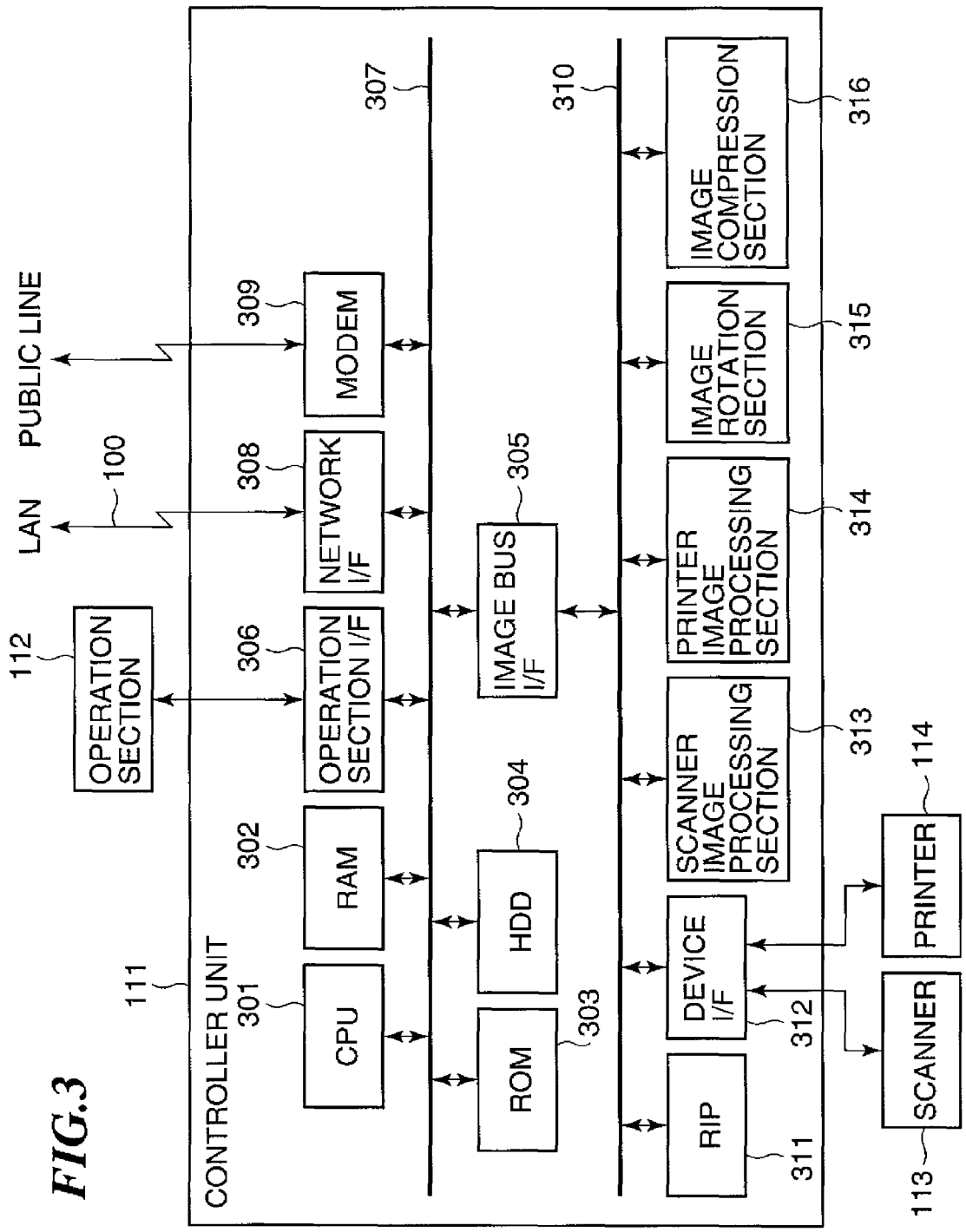
FIG. 3 is a block diagram showing a detailed configuration of the image processing apparatus 110 shown in FIG. 1.

FIG. 3 is a block diagram showing a detailed configuration of the image processing apparatus 110 shown in FIG. 1.

In FIG. 3, reference numeral 111 denotes a controller unit configured to control the entire apparatus. To the controller unit 111 are connected the scanner 113 as an image input device and/or the printer 114 as an image output device, which are controlled by the controller unit 111. The controller unit 111 is further connected with the LAN 100 and/or a public line, via which the controller unit 111 performs input/output of image information and/or device information in association with an external device. In this instance, devices that are connected to the public line include a facsimile machine or an information processing apparatus having a facsimile function.

The controller unit 111 is connected via a system bus 307 with devices including a CPU 301, a RAM 302, a ROM 303, a hard disk device (HDD) 304, an image bus I/F 305, an operation section I/F 306, a network I/F 308, and a modem 309.

The RAM 302 is directed to a memory for providing a work area for the CPU 301 and is also used as image memory for temporarily storing image data. The ROM 303 is directed to a boot ROM which stores a boot program for the system. The HDD 304 is configured to a system software, image data and the like.

The operation section I/F 306, directed to an input/output interface with the operation section 112, outputs to the operation section 112 image data to be displayed on the operation section 112. The operation section I/F 306 also serves to send to the CPU 301 information input by the user from the operation section 112.

A network I/F 308 is connected to the LAN for inputting and outputting information to and from the LAN. The modem 309 is connected to the public line for inputting and outputting information to and from the public line.

The image bus I/F 305 is directed to a bus bridge for connecting between the system bus 307 and an image bus 310 through which image data is transferred at a high speed, and converting data structure.

To the image bus 310 are connected a raster image processor (RIP) 311, a device I/F 312, a scanner image processing section 313, a printer image processing section 314, an image rotation section 315, and an image compression section 316.

The RIP 311 converts a PDL code received from the LAN into a bitmap image. The device I/F 312 connects the scanner 113 and the printer 114 with the controller unit 111 and performs synchronous/asynchronous conversion on image data.

The scanner image processing section 313 applies correction, manipulation, editing and the like on input image data. The printer image processing section 314 applies printer correction, resolution conversion and the like on image data for printing output. The image rotation section 315 performs rotation of image data.

The image compression section 316 applies JPEG compression/decompression on multivalued image data, and JBIG, MMR, or MH compression/decompression on binary image data.

Exterior Appearance of Image Processing Apparatus 110

A description will be given of the exterior appearance of the image processing apparatus, with reference to FIG. 4.

Figure 4:
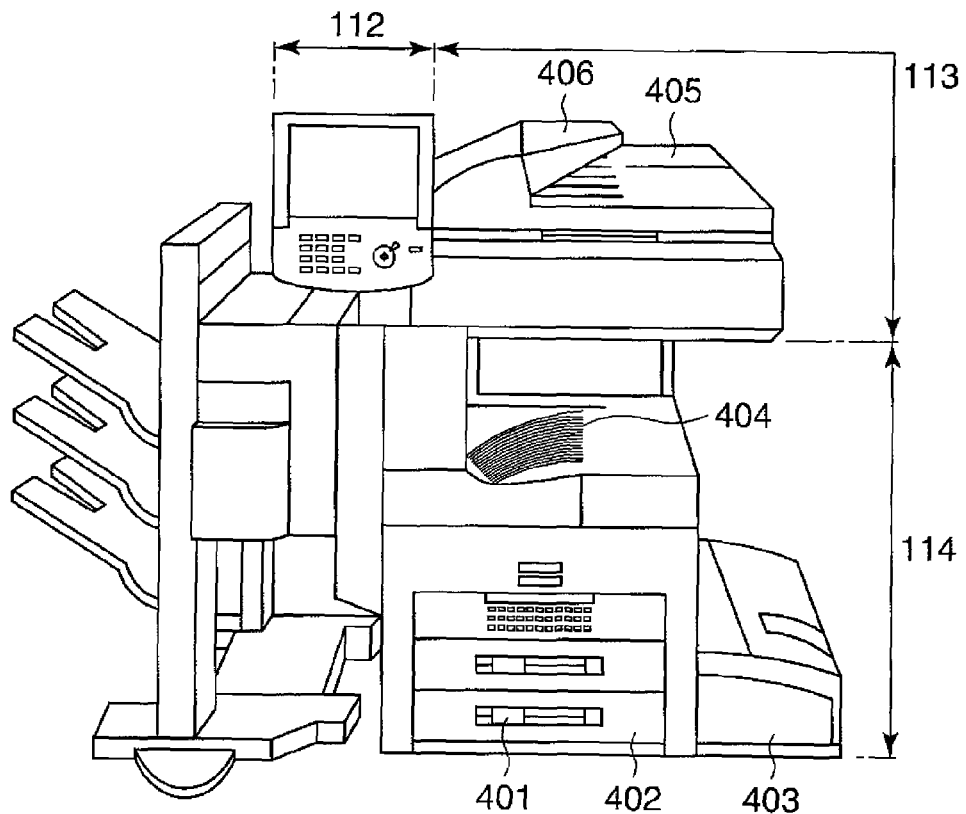
FIG. 4 is a view showing an exterior appearance of the image processing apparatus 110 shown in FIG. 1.

FIG. 4 is a view showing an exterior appearance of the image processing apparatus 110 shown in FIG. 1.

In the image processing apparatus 110 of FIG. 4, the scanner 113 scans an image on an original sheet to generate raster image data using a CCD line sensor (not shown).

When the user instructs to start reading of original sheets through the operation section 112 with the original sheets put on a tray 406 of a sheet feeder 405, the CPU 301 of the controller unit 111 gives an instruction to the scanner 113. Then, the sheet feeder 405 feeds the original sheets one by one, and the scanner 113 performs reading of the images on the original sheets fed from the sheet feeder 405.

The printer 114 is configured to print raster image data on the sheet, employing an electro-photographic method involving a photosensitive drum and/or a photosensitive belt, as a printing method thereof.

It goes without saying that there may be employed, as the printing method, any other method, such as an ink-jet method of injecting ink from a micro-nozzle array directly onto a sheet to make printing.

Printing operations of the printer 114 are initiated in response to an instruction from the CPU 301. The printer 114 has a plurality of sheet feed stages of different sheet sized or orientation from which the user can select, which sheet feed stages include corresponding sheet cassettes 401, 402 and 403, respectively.

A catch tray 404 is also provided, onto which printed sheets are ejected.

Exterior Appearance of Operation Section 112 of Image Processing Apparatus 110

A description will be given of an exterior appearance of the operation section 112, with reference to FIG. 5.

Figure 5:
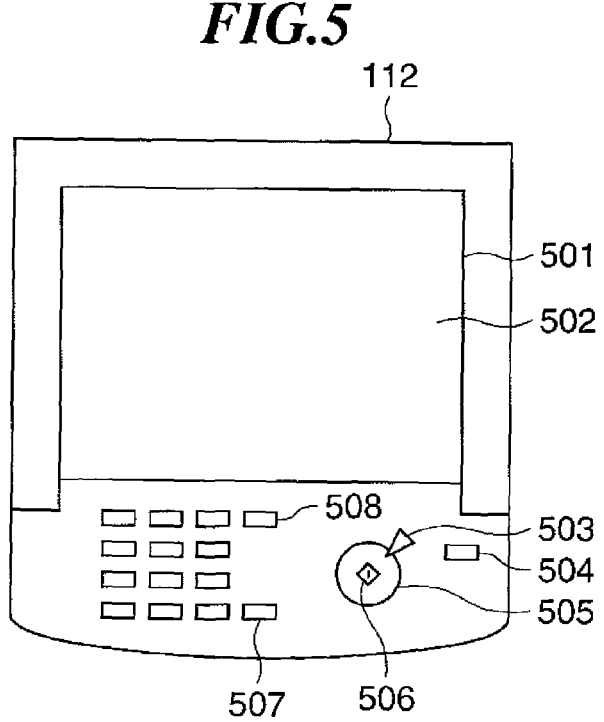
FIG. 5 is a view showing an exterior appearance of an operation section 112 shown in FIG. 1.

FIG. 5 is a view showing an exterior appearance of the operation section 112 shown in FIG. 1.

In FIG. 5, the operation section 112 has an LCD display section 501 with a touch panel 502 adhered thereonto.

On the LCD display section 501 are displayed a screen for system operation and soft keys, and when one of the displayed keys is depressed, position information indicating the position of the pressed key is sent to the CPU 301.

Also provided on the operation section 112 are various hard keys, including a start key 505, a stop key 503, an ID key 507, and a reset key 504.

The start key 505 is for instructing to start a reading operation for the original image, and an LED display section 506 of two colors, green and red, is provided on the center of the start key 505.

The two-color LED display section 506 indicates whether or not the start key 505 is available depending on its color. The stop key 503 is for stopping the ongoing operation.

The ID key 507 is for inputting the user's user ID. The reset key 504 is for initializing settings made by the operation section 112.

Configuration of Operation Section 112 of Image Processing Apparatus 110

A description will be given of the configuration of the operation section 112, with reference to FIG. 6.

Figure 6:
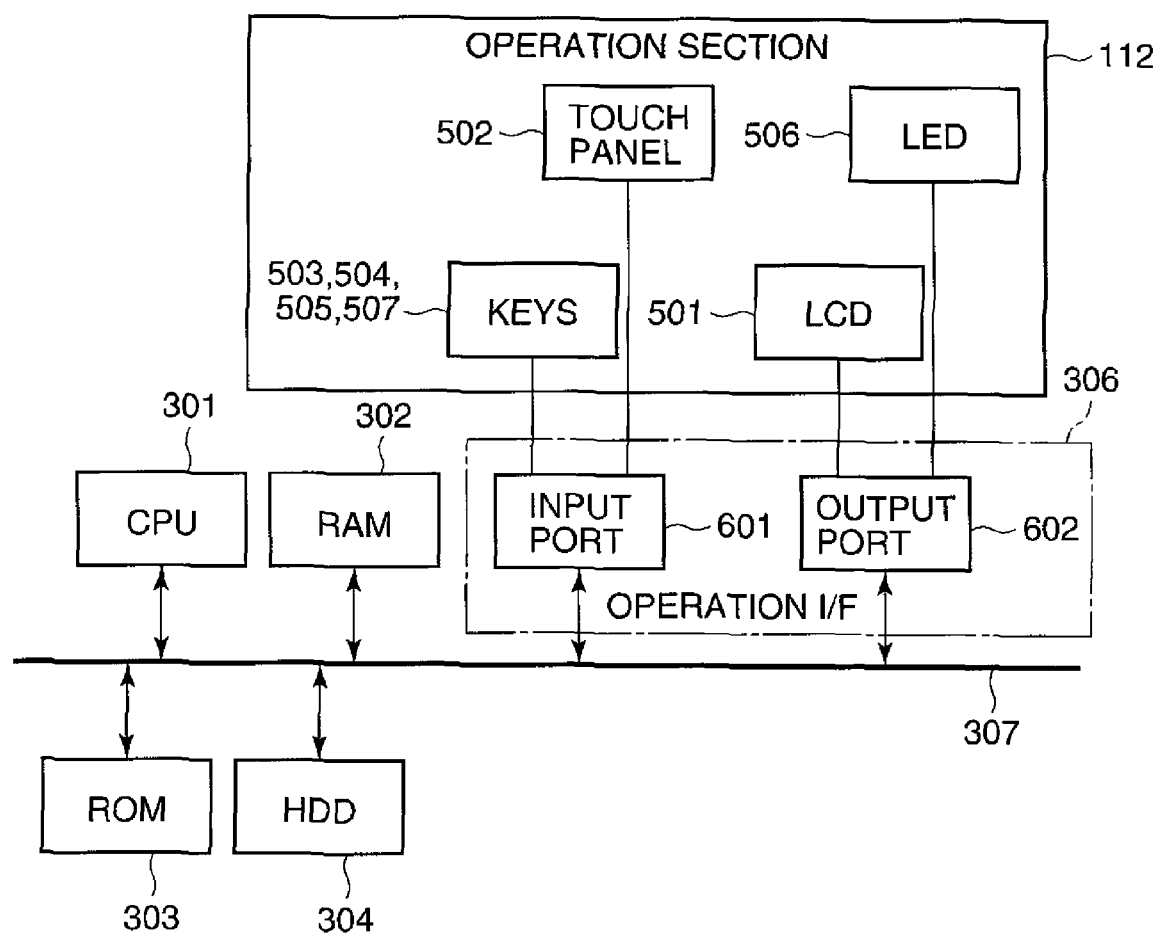
FIG. 6 is a block diagram showing a detailed configuration of the operation section 112 in FIG. 1.

FIG. 6 is a block diagram showing a detailed configuration of the operation section 112 in FIG. 1.

In FIG. 6, the operation section 112 is connected with the system bus 307 via the operation section I/F 306. To the system bus 307, the CPU 301, the RAM 302, the ROM 303, the HDD 304 and so forth are connected as mentioned above.

The operation section I/F 306 has an input port 601 for controlling input from the user and an output port 602 for controlling a screen output device.

The input port 601 transfers to the CPU 301 user's input from the touch panel 502 and a key group including the various kinds of hard keys 503, 504, 505 and 507.

The CPU 301 generates display screen data based on contents of the user's input and a control program, and outputs a display screen to the LCD display section 501 via the output port 602. The CPU 301 also controls the LED display section 506 via the output port 602 as occasion demands.

Configuration of Web Browser Module 209 of Image Processing Apparatus 110

The web browser 209 shown in FIG. 2 establishes a connection and communicates with other network node via the HTTP module 214. Due to this communication, an HTTP request is issued for a resource described in an URL manner and a response thereto is obtained. In the course of this communication, coding and decoding of the communicated data according to any of various coding methods are also performed.

An event handling section (not shown) receives an event for an operation performed by the user on the touch panel 502 or a key of the operation section 112 and performs a processing corresponding to the event.

The event handling section also receives a state transition event for the apparatus or a job from the control API 218 and performs a processing corresponding to the event.

A script interpreter (not shown) is for interpreting and executing a script of Java (Registered Trademark), Script (ECMAScript) or the like.

The script is embedded in a document or described in a separate file linked from a document. A provider of contents can program a dynamic behavior of the provided document through the script.

Request and Response Processing Flow in HTTP Protocol

Figure 7:
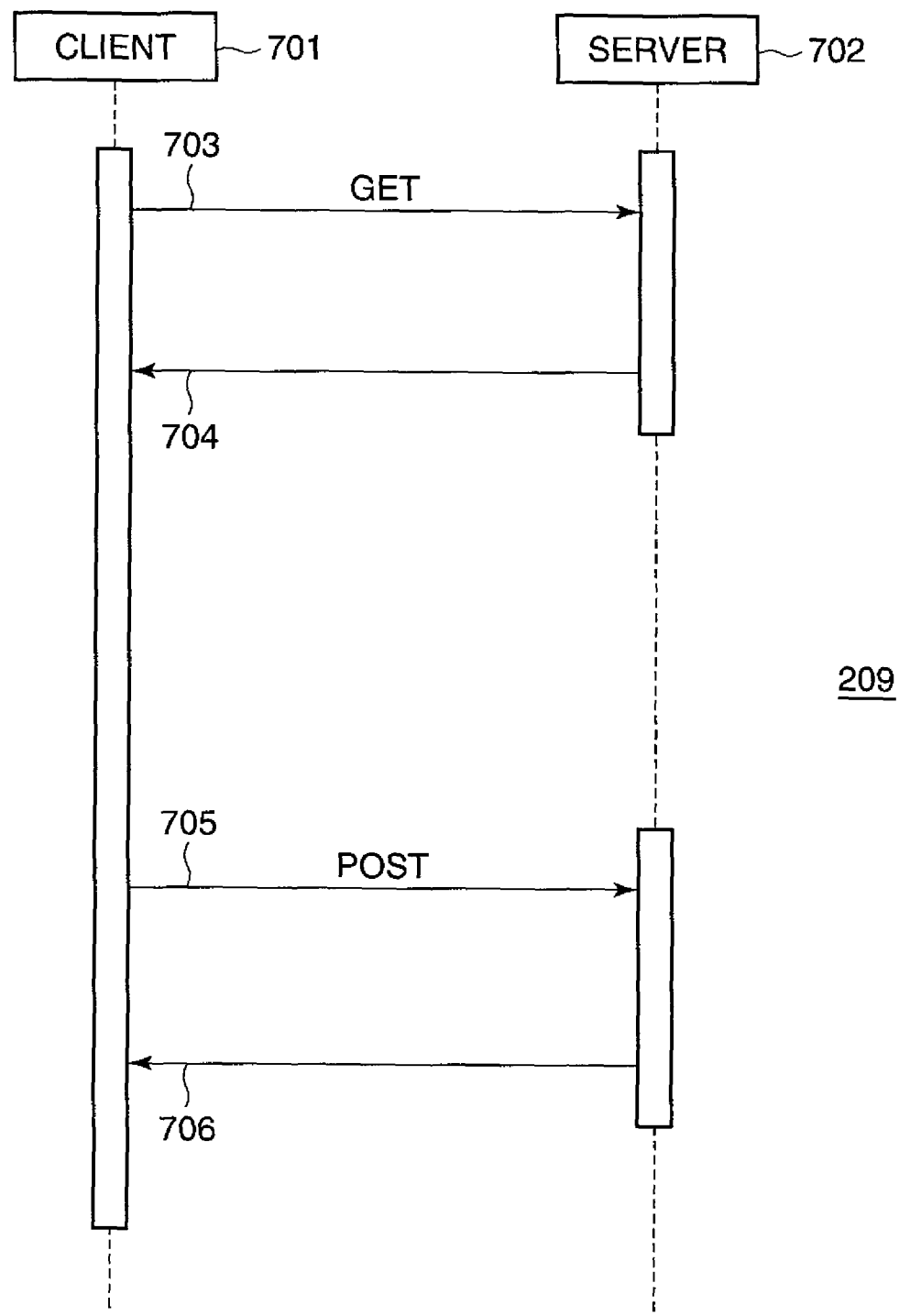
FIG. 7 is a view showing a request and a response processing flow according to an HTTP protocol which is performed by an HTTP module 214 shown in FIG. 2.

FIG. 7 is a view showing a request and a response processing flow according to an HTTP protocol which is performed by the HTTP module 214 shown in FIG. 2.

In FIG. 7, a client 701 is directed to an apparatus having implemented therein a software for transmitting an HTTP request and receiving an HTTP request. In the present embodiment, the client 701 corresponds to the image processing apparatus 110 with the web browser 209 implemented therein and/or the host computer 120 with a web browser implemented therein.

A server 702 is directed to a software for receiving the HTTP request to perform the corresponding processing and further returns the HTTP response, as corresponding to the server 130 shown in FIG. 1 in the present embodiment.

The client 701 is capable of transmitting the HTTP request through either a GET method or a POST method.

When the client 701 transmits the HTTP request 703 for a desired resource to the server 702 through the GET method, the resource is generally designated in the form of a URI (a URL in particular).

The server 702 then retrieves or generates data corresponding to the resource designated through the HTTP request 703 and returns the data through the HTTP request 704.

A description will be given of a case in which the HTTP request is sent through the POST method. When an HTML document contains a form and the POST method is designated as the method for transmitting the HTML document, processings are performed as described below.

Specifically, information input by the user into the form displayed on the web browser of the client 701 is coded. The client 701 then attaches the coded information, namely what has been input to the form, to the HTTP response 705 and sends it to the sever 702.

On the server 702, the specified resource receives the data transmitted from the client 701 with the processing performed, and generates the HTTP response 706 to send it back to the client 701.

Browser Screen Configuration of Image Processing Apparatus 110

A description will be given of a screen configuration of the web browser displayed by the UI module 201, with reference to FIG. 8.

Figure 8:
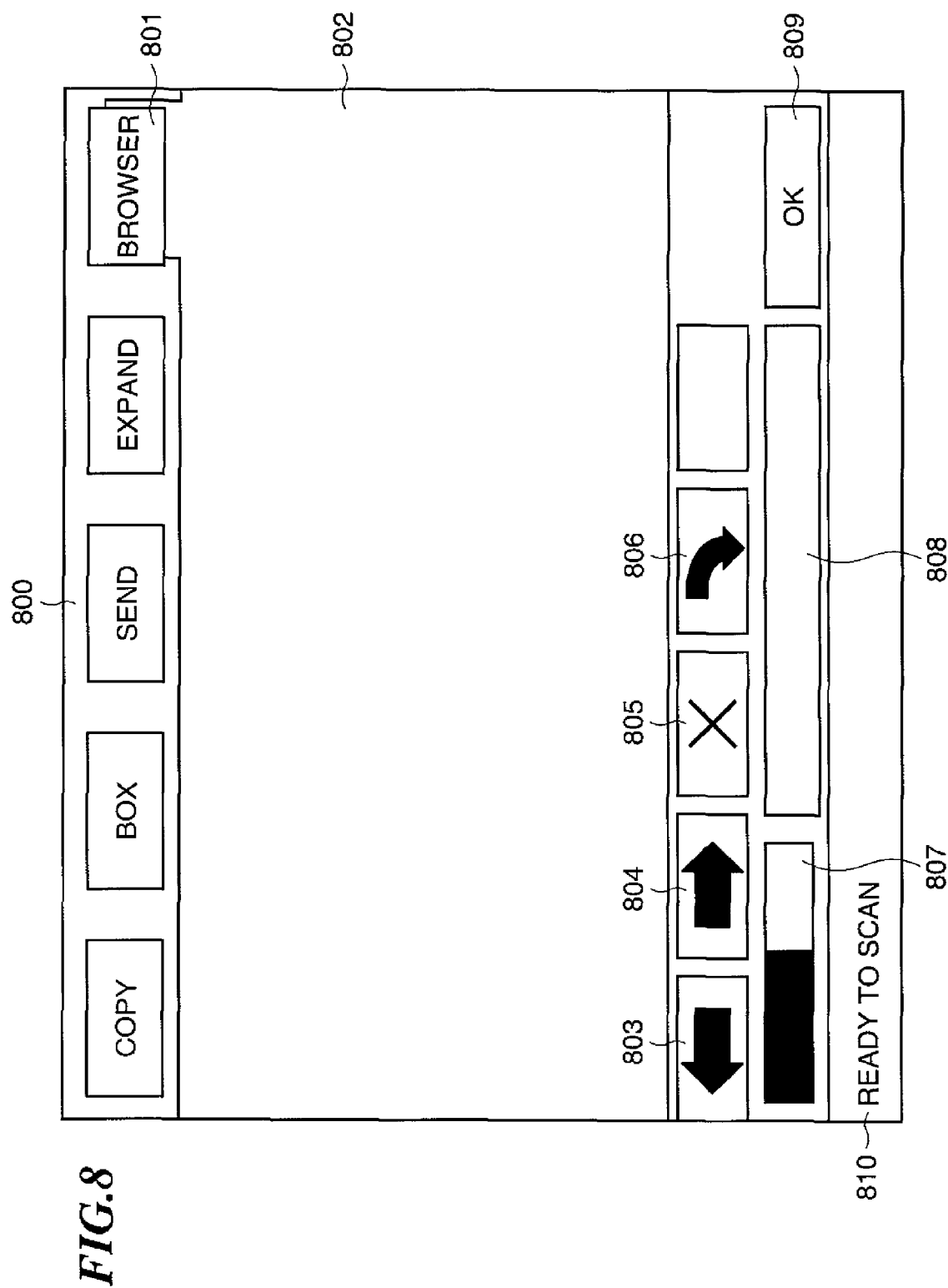
FIG. 8 is a view showing an example of a user interface displayed on an LCD display section 501 shown in FIG. 6.

FIG. 8 is a view showing an example of a user interface that is displayed on the LCD display section 501 shown in FIG. 6. The present example corresponds to the screen of the web browser displayed by the UI module 201.

As shown in FIG. 8, on a browser screen 800, a URL entry field 808, a content display area 802, and a status area 807 are displayed. Also displayed on the browser screen 800 are buttons, such as a tab 801, an OK button 809, a progress bar, a back button 803, a forward button 804, a reload button 806, and a stop button 805. It should be noted that the form and position of displaying the buttons and the like are not limited to the present display screen example.

The tab 801 functions as a button for switching between a screen for web browser functions and screens for other functions (such as copy, box, transmission, and expansion). The URL entry field 808 is a field for the user to input the URL of a desired resource, and when the user depresses the field, a virtual full keyboard (not shown) for character entry appears.

The user can input a desired character string with soft keys that look like keys positioned on the virtual full keyboard.

The OK button 809 is directed to a soft key for confirming a URL character string that has been input. Confirmation of the URL allows the web browser module 209 to issue the HTTP request for obtaining the resource of interest.

The progress bar indicates the progress situation of a content retrieval process that is performed based on the HTTP request and response. The content display area 802 is directed to an area where the retrieved resource is displayed. The back button 803 is directed to a soft key for allowing display of the content display area 802 to go back through the content display history and subsequently display again a content that was displayed before the currently displayed content.

The forward button 804 is directed to a soft key for allowing display of the content display area 802 to go back to a content that was displayed after the currently displayed content when contents are displayed retroactively through the content display history.

The reload button 806 is for re-acquiring and re-displaying the currently displayed content. The stop button 805 is directed to a soft key for stopping an ongoing content retrieval process.

The status area 810 is directed to an area where a message from any of various functions of the image processing apparatus is displayed. The status area 810 can display a message for catching the user's attention from the scanner, the printer, or the other functions even when the browser screen 800 is displayed.

A message can also be displayed from the web browser functions. The web browser functions may display a URL character string of a link, a character string of a content title, a message specified in a script or the like.

Authentication Context Management Module

The ACM 206 shown in FIG. 2 manages authentication contexts that are received from authentication service modules including the LAS 210, the RAS 211, and the WAS 212. The LAS 210, the RAS 211, and the WAS 212 transfer information required as an authentication context to the ACM 206 upon success in authentication. The ACM 206 creates an authentication context and writes user information into the context. Thus, once the authentication has been successful and the user information has been written into the authentication context, all the subsequent operations by the user are performed under the authority of the user who is written in the authentication context.

The ACM 206 further manages authentication contexts. The authentication context is managed by the ACM 206 for a period from success in the user authentication and creation of the authentication context as mentioned above to a logout process for the user.

A condition for logout may be that a logout process is performed by the user, that no operation is performed for a preset timeout period, that information on various device settings is changed, transition to low-power mode, and re-startup of a device.

Next, a description will be given of a data structure of an authentication context, with reference to FIG. 9.

FIG. 9 is a view which is useful in explaining a data structure of an authentication context created and managed by the ACM 206 shown in FIG. 2.

In FIG. 9, an attribute column 901 shows attributes of the authentication context, and a data type (DataType) column 902 shows a data type corresponding to each attribute.

Authentication service type attribute (AuthSvcType) 903 stores information for identifying which authentication service (the LAS 210, the RAS 211, and the WAS 212) creates the authentication context of interest.

An authentication server address attribute (AuthSerIP) 904 stores the IP address of the authentication server 140. An ST attribute (Security Token) 905 stores the ST obtained from the authentication server 140.

A user name attribute (UserName) 906 stores a user name obtained from the authentication server 140. An user ID attribute (UserID) 907 stores the user's user ID obtained from the authentication server 140.

A group name attribute (GroupName) 908 stores a group name obtained from the authentication server 140 to which the user belongs. A group ID attribute (GroupID) 909 stores the group ID of the group obtained from the authentication server 140.

A domain name attribute (DomainName) 910 stores a domain name obtained from the authentication server 140 to which the user belongs. A mail address attribute (Email) 911 stores a mail address of the user obtained from the authentication server 140. Reference numeral 912 denotes an access right attribute (AccessRight).

Processing for Web Service Authentication Module 212

Figure 10:
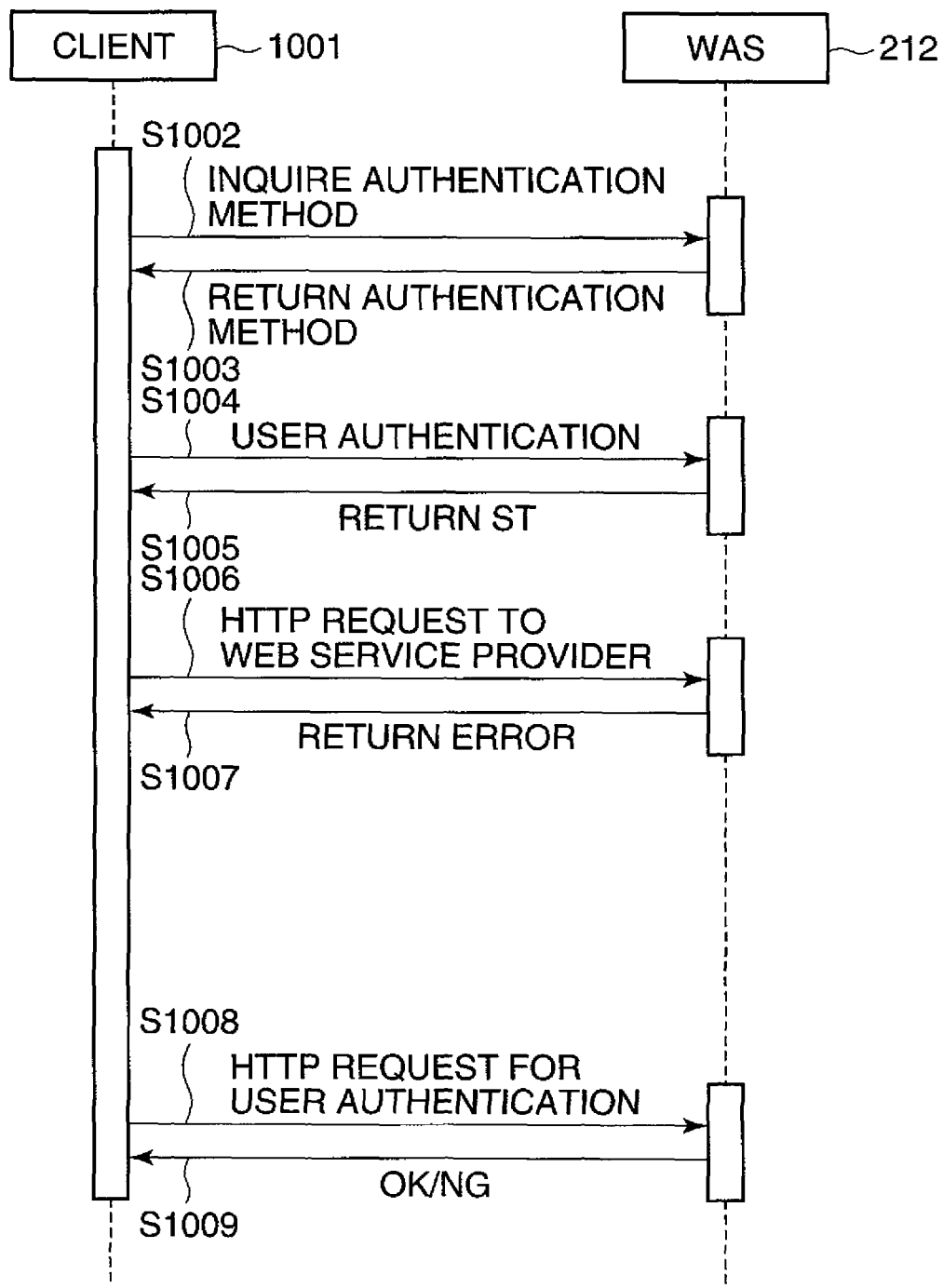
FIG. 10 is a view which is useful in explaining an example of a processing for a WAS 212 shown in FIG. 2.

FIG. 10 is a view which is useful in explaining an example of a processing for the WAS 212 shown in FIG. 2. FIG. 10 includes respective steps S1002 to S1009.

In FIG. 10, a client 1001 is directed to a terminal having implemented thereon a software for transmitting an HTTP request as a web service to the WAS 212 and receiving an HTTP response, which terminal corresponds to the server 130 in the present embodiment.

First, in step S1002, the client 1001 sends to the WAS 212 of the image processing apparatus 110 an HTTP request for inquiring about an authentication method. Next, in step S1003, the WAS 212 returns the authentication method to the client 1001 in response to the request made in the step S1002 by the client 1001.

Then, in step S1004, the WAS 212 performs user authentication for a Credential received from the client 1001.

After the ST is transferred from the client 1001 to the WAS 212 with user authentication performed in the step S1004, the web service authentication service module 212 checks whether or not the ST is valid to the authentication server. In this instance, if the ST is valid, OK is returned from the authentication server 140.

Upon success in the user authentication, the WAS 212 requests the ACM 206 to create an authentication context. The ACM 206 creates an authentication context based on the ST and the user information, and saves the context. This creation of the authentication context enables the user to utilize services of the image processing apparatus 110 via a web service by his authority based on the authentication context.

Then, in step S1005, the WAS 212 returns the ST to the client 1001, and then, in step S1006, the client 1001 inserts the ST into a header portion of the web service description with the ST added to the header portion, and sends an HTTP request to the image processing apparatus 110.

The WAS 212 reads the ST in the header portion of the HTTP request received from the client 1001, and determines whether the ST is valid. If it determines that the ST is not valid, the WAS 212 returns an error to the client 1001 in step S1007. If it determines that the ST is valid, the WAS 212 checks whether or not the authentication context created by way of the local authentication service and the authentication context created by way of the web service agree with each other.

If it determines that the two authentication contexts agree with each other, the WAS 212 makes a web service call to the WSP 207. On the other hand, if it determines that the two authentication contexts do not agree with each other, the WAS 212 returns an error to the client 1001 in step S1007.

Next, in step S1008, the client 1001 sends an HTTP request for logout to the WAS 212. Upon receiving the logout request, the WAS 212 requests the ACM 206 to discard the corresponding authentication context, and the ACM 206 discards the authentication context.

Then, in step S1009, OK is returned from the WAS 212 to the client 1001 if the authentication context is discarded, and NG is returned if the discard has failed.

Detailed Configuration of Server 130

A description will be given of a detailed configuration of the server 130, with reference to FIG. 11.

FIG. 11 is a block diagram showing a detailed configuration of the server 130 shown in FIG. 1.

In FIG. 11, a business logic section 1103 of the application server section 132 executes a processing on calling of the web server section 131 in response to the HTTP request. The business logic section 1103 returns a dynamically generated HTML to the web server section 131 as the result of the processing.

A script engine section 1102 of the application server section 132 is called from the business logic section 1103 and loads a script from a program management area 1105 discussed below and returns the script to the business logic section 1103. In this instance, a script corresponds to a program execution description.

The business logic section 1103 sequentially executes scripts loaded by the script engine section 1102. A web service requestor section 1101 is called by the business logic section 1103 to make a web service call to an external web service provider (e.g., the WSP 207).

An authentication section 1104 is called by the business logic section 1103 to manage and control a user authentication process, and manage the user information and the user settings. The program management area 1105 of the data management section 133 manages various scripts and programs that are called from the scripts. Data in the program management area 1105 permits addition and/or modification through a plug-in mechanism (not shown). This plug-in mechanism enables customization of functions of the server 130.

A data storage area 1106 is directed to an area for storing data such as documents. A preference data area 1107 is directed to an area for storing each user's setting information.

The business logic section 1103 obtains each user's setting information stored in the preference data area 1107 with the ST obtained from the authentication section 1104 as an access key. Using each user's setting information obtained, the business logic section 1103 further provides a screen and/or functions that are customized for that user.

With such a system configuration as described above, the user operating the image processing apparatus 110 obtains a user interface (operation screen) implemented on the server 130, and has the user interface (operation screen) displayed on the operation section 112 of the image processing apparatus 110. Using the user interface (operation screen) displayed on the operation section 112, the user gives an instruction of making the image processing apparatus 110 execute a desired processing. The instruction given by the user is transmitted to the server 130 from the image processing apparatus 110. The server 130 determines a processing that should be made by the instruction from the user and transmits a processing request corresponding to the processing to the image processing apparatus 110. The image processing apparatus 110 receives the processing request transmitted from the server 130 and operates in accordance with the processing request. Such operations allow the user to make the image processing apparatus 110 perform a desired processing using the interface implemented on the server 130. The processing request may be made in a session which is started by the server 130 transmitting the user interface or made in another session, which is started, different from that session.

It should be noted that the processing request also contains information identifying the image processing apparatus 110 to thereby cause the image processing apparatus 110 to execute a processing.

The user also can make the image processing apparatus 110 operate as follows. For example, through the user interface implemented on the server 130, the user can transmit a processing request to an external apparatus other than the server 130 and control the external apparatus to transmit the result of the processing request to the image processing apparatus 110. A processing by the external apparatus as called herein may include a data download request, for example, where the external apparatus downloads data from a location specified by the user, and transmits the downloaded data to the image processing apparatus 110 when the download is completed.

Next, a description will be given of an image processing in the image processing system according to the embodiment of the present invention, with reference to the flowcharts of FIGS. 12A and 12B.

Figure 12A:
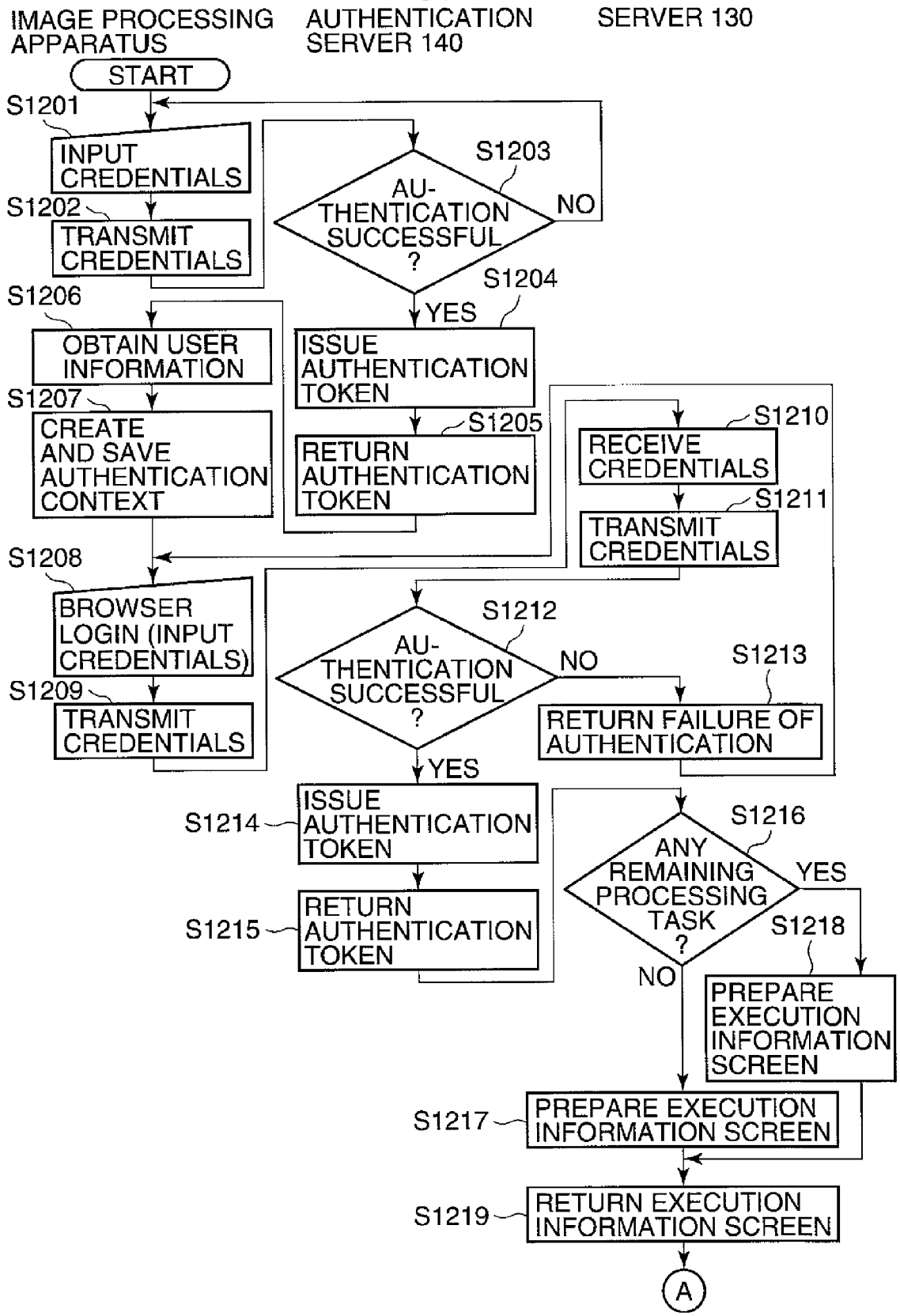
FIGS. 12A and 12B are flowcharts which are useful in explaining a data processing performed in the image processing system according to the embodiment of the present invention.
Figure 12B:
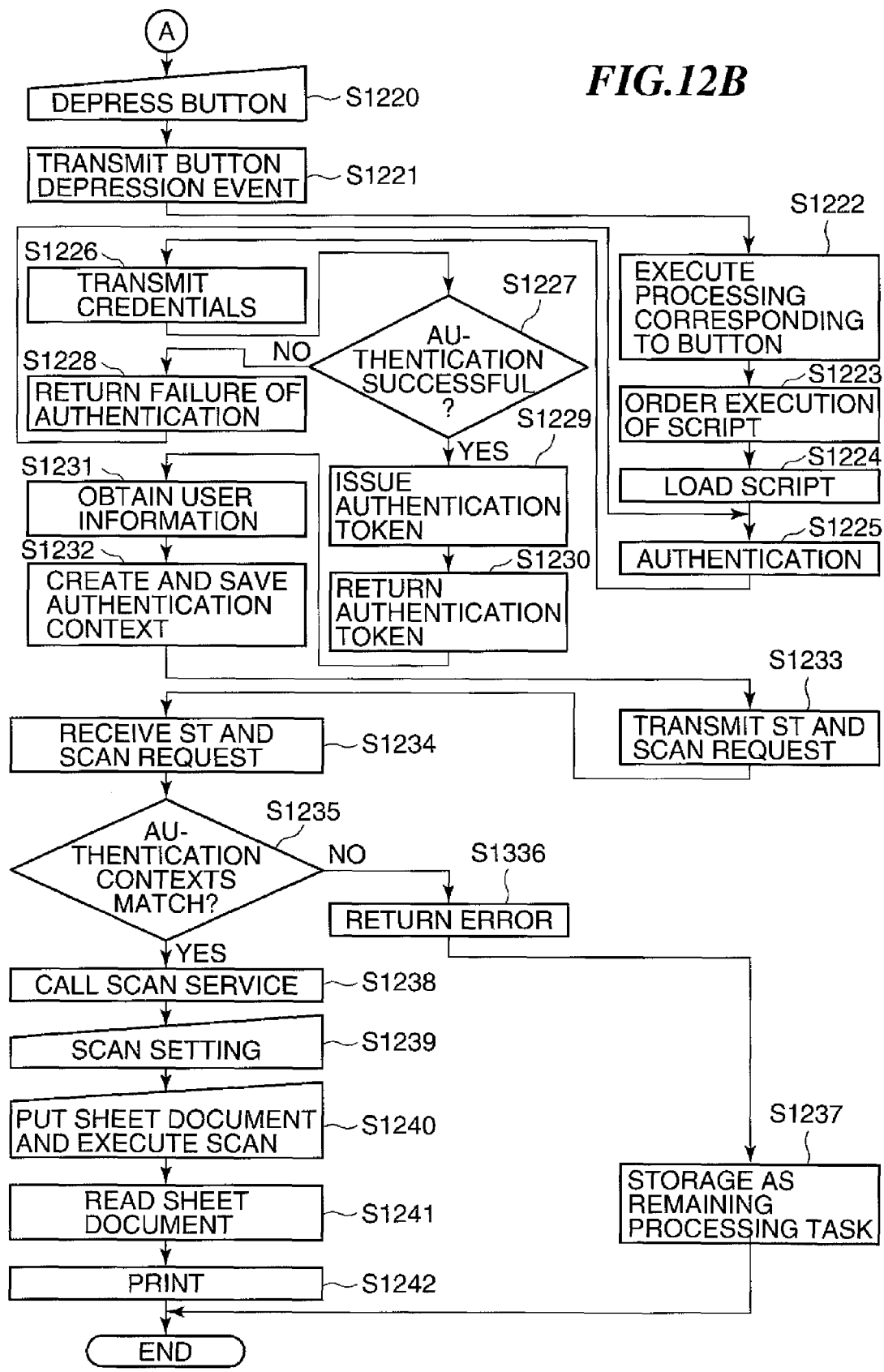

FIGS. 12A and 12B are flowcharts which are useful in explaining a data processing performed in the image processing system according to the embodiment of the invention. The present example is directed to an example of the image processing performed in the image processing system including the image processing apparatus 110, the server 130, and the authentication server 140, especially to an example of a sequence of data processings that are performed when the image processing apparatus 110 requests an image processing using a UI service provided by the server 130. Steps S1201, S1202, S1206 to S1209, S1220, S1221, S1226, S1228, S1231, S1232, S1234, S1235, S1236, and S1238 to S1242 correspond to processings by the image processings apparatus. Steps S1203 to S1205, S1212 to S1215, S1227, S1229, and S1230 correspond to processings by the authentication server 140. Steps S1210, S1211, S1213, S1216 to S1219, S1222 to S1225, S1233, and S1237 represent processings by the server 130. The individual steps are realized by CPUs loading modules shown in FIG. 2 into RAM to execute the modules in the image processing apparatus 110, the authentication server 140, and the server 130, respectively. It should be noted that for the sake of description, the processing will be described for every module for providing control.

Figure 13:
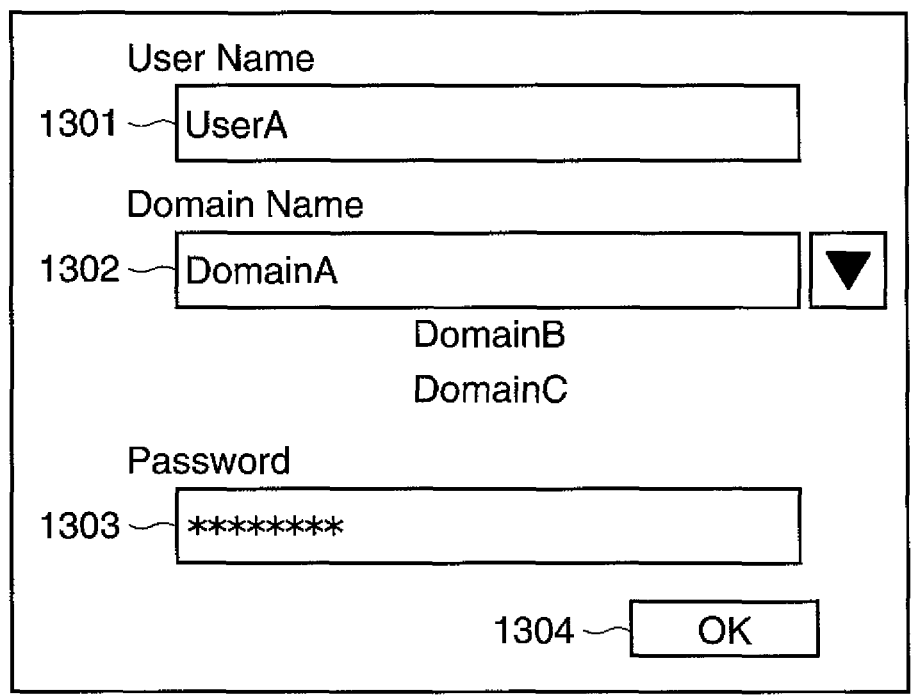
FIG. 13 is a view which is useful in explaining an example of a login screen displayed on the operation section 112 in the image processing apparatus 110 shown in FIG. 1.

FIG. 13 is a view which is useful in explaining an example of a login screen that is displayed on the operation section 112 in the image processing apparatus 110 shown in FIG. 1. The login screen constitutes the user interface (operation screen) acquired from the server 130, and includes a user name entry text box 1301, a domain name entry text box 1302, and a password entry text box 1303. In the present example, the user inputs Credentials including a user name, a domain name, and a password to log in the image processing apparatus 110 with the manipulation of the operation section 112. When the user logs in the image processing apparatus 110, the user is permitted to use the image processing apparatus 110.

Also, in the present embodiment, a description will be given of a case where the authentication server 140 is configured as an independent information processing apparatus as an image processing system; however, the image processing apparatus 110 or the server 130 may be provided with similar functions to those of the authentication server 140.

In FIG. 12A, the user inputs its user name into the user name entry text box 1301 in FIG. 13 that is displayed on the operation section 112 (step S1201). When the user selects the user name entry text box 1301, the UI module 201 displays a soft keyboard on the operation section 112. The user can thereby easily input characters.

Similarly, the user selects a pre-registered domain name from the domain name entry text box 1302 in FIG. 13 that is displayed on the operation section 112. It should be noted that the number of domains displayed in the domain name entry text box 1302 corresponds to the number of the authentication servers supported by the image processing apparatus 110.

In other words, the image processing apparatus 110 can communicate with a plurality of authentication servers.

The user also inputs a password into the password entry text box 1303 in FIG. 13 that is displayed on the operation section 112. After the user has thus input or selected the user name, the domain name, and the password, the OK button 1304 is depressed. Thereupon, the Credentials that have been input, namely the user name, the domain name, and the password, are transmitted from the UI module 201 to the LAS 210.

Then, in step S1202, the LAS 210 transmits the Credentials to the authentication server 140. Then, in step S1203, the authentication server 140 performs the user authentication based on the Credentials of each user registered in advance to the authentication server 140 and the Credentials received from the LAS 210. In this instance, the authentication server 140 determines whether or not the user authentication based on the Credentials received from the LAS 210 has been successful. If the authentication server 140 determines that the user authentication has failed, the program returns to the step S1201. In other words, when the Credentials received from the LAS 210 are not valid, the authentication server 140 returns the authentication failure to the LAS 210 to display an authentication screen on the operation section 112 again, followed by the program processing to the step S1201.

On the other hand, as a result of the determination in the step S1203, if the authentication server 140 determines that the user authentication based on the Credentials received from the LAS 210 has been successful, the program proceeds to step S1204.

Then, in the step S1204, the authentication server 140 issues the ST (authentication token) corresponding to the Credentials received from the image processing apparatus 110, and returns the ST to the LAS 210 (step S1205).

Then, in step S1206, the LAS 210 makes an inquiry to the authentication server 140 again with the ST received from the authentication server 140 as a key to obtain the user information. Then, in step S1207, the ACM 206 creates an authentication context and saves the authentication context in the RAM 302.

In this instance, the user operating the image processing apparatus 110 gives an instruction to display the browser screen 800 on the operation section 112. According to the user's instruction, the web browser module 209 of the image processing apparatus 110 transmits an HTTP request of the GET method to the URL of the server 130 based on the initial display URL information managed in the UPM 208. Because the server 130 operates on the condition that the user authentication has been successful, it determines that the user authentication to the client having sent the HTTP request has not been performed if the received HTTP request does not contain the ST. In this case, the server 130 returns an HTTP response corresponding to the login screen to the web browser module 209 of the image processing apparatus 110, and the browser screen 800 displays a login screen for the server 130.

However, if the server 130 supports Single Sign-On (SSO), the ST of the authentication server 140 is already maintained in the authentication context management module 206 of the image processing apparatus 110. Thus, transmitting the ST to the server 130 with the ST included in the HTTP request enables steps S1208 to S1215 to be omitted. When the step S1208 to S1215 are omitted, the program proceeds directly to step S1216 from the step S1207. Omitting the steps S1208 to S1215 enables the user to have only to input the Credentials when logging in the image processing apparatus 110 in the step S1201, thereby eliminating the need for inputting the Credentials again in the step S1208, which improves the operability.

In the step S1208, input of the Credentials, including the user name, the domain name, and the password, from the user who is manipulating the operation section 112, is accepted on the browser login screen (not shown) of the image processing apparatus 110. Then, in step S1209, the web browser module 209 of the image processing apparatus 110 transmits the Credentials to the server 130 as an HTTP request of the PUT method through the HTTP module 214.

Next, in step S1210, the web server section 131 of the server 130 receives the Credentials from the image processing apparatus 110 as an HTTP request. Then, in step S1211, the authentication section 1104 of the server 130 receives the Credentials by way of the business logic section 1103 from the web server section 131, and transmits the Credentials to the authentication server 140.

Then, in step S1212, the authentication server 140 performs the user authentication using the Credentials pre-registered for every user and the Credentials received from the authentication section 1104 of the server 130. In this instance, the authentication section 1104 determines whether or not user authentication has been successful, and then if it is determined that user authentication has been successful, the program proceeds to step S1214.

However, as a result of the determination of the step S1212 if the authentication section 1104 determines that the Credentials received from the authentication section 1104 of the server 130 are not valid, the program proceeds to step S1213. In the step S1213, the web server section 131 creates an HTML which is a combination of a message indicating the authentication failure to the image processing apparatus 110 and an authentication screen, and returns the HTML to the image processing apparatus 110 as an HTTP response.

Next, in the step S1214, the authentication server 140 issues the ST corresponding to the Credentials, and in step S1215, the authentication server 140 returns the ST to the authentication section 1104 of the server 130.

The authentication section 1104 of the server 130 then uses the ST received from the authentication server 140 to make an inquiry to the authentication server 140 again and acquire the user information. The authentication section 1104 then stores the ST and the user information obtained in the preference data area 1107.

Then, if the user authentication has been successful, the business logic section 1103 of the server 130 retrieves the user information required for the user screen creation from the preference data area 1107 of the data management section 133 using the user's ST as an access key.

Next, in step S1216, the business logic section 1103 determines whether or not there is any remaining processing task that has failed to be completed previously. If the business logic section 1103 determines that there is no remaining processing task, the program proceeds to step S1217. If the business logic section 1103 determines that there is a remaining processing task, the program proceeds to step S1218. It should be noted that the remaining processing task refers to a processing task that is left in the server 130 in step S1237, described later, when any one of the buttons 1401 to 1404 shown in FIG. 14 was depressed by the user but its function has failed to be executed. Contents stored in the step S1237, described later, include the user information identifying the user who operates the button and a script corresponding to the button. This makes it possible to identify the user from the authentication information at the next login by the user and display any remaining processing task only for this user.

Figure 14:
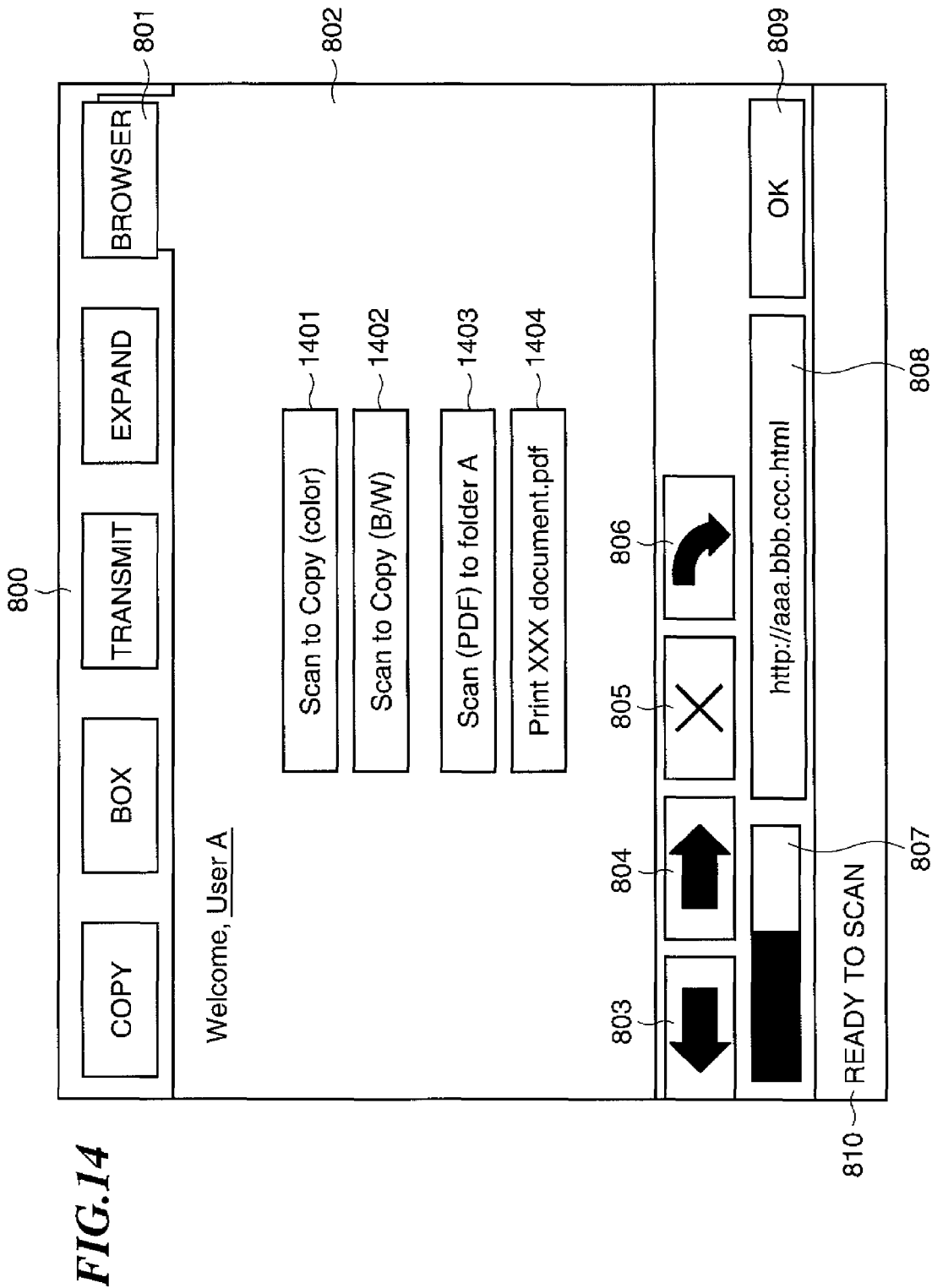
FIG. 14 is a view which is useful in explaining an example of a user interface displayed on the operation section 112 shown in FIG. 2.

That is to say, storing and managing the user information and the script corresponding to the button in the server 130 enables a function corresponding to the button to be executed when the user logs in again. As an example, when a function corresponding to the button 1403, namely Scan to Folder A, shown in FIG. 14, is executed, the processing may be suspended during the authentication process after the button 1403 is depressed by the user. The individual buttons of FIG. 14 are described later. In such a case, information such as a path to a storage set for the function is held, thereby eliminating the need for processings such as setting of the path next time the user logs in, which reduces the user's operational burden.

Then, in step S1217, the business logic section 1103 composes a user-relevant screen corresponding to the user information to prepare execution screen information (i.e., a Web page), followed by the program proceeding to step S1219.

Meanwhile, in step S1218, the business logic section 1103 composes a screen including remaining processing-displayed screen and a user-relevant screen corresponding to the user information to prepare execution screen information (i.e., a Web page).

Then, in step S1219, the web server section 131 returns the execution screen information prepared by the business logic section 1103 to the image processing apparatus 110 as an HTTP response to the HTTP request from the image processing apparatus 110 received in the step S1209. The screen information prepared in the step S1219 is transmitted to the image processing apparatus 110.

A description will be given of an exemplary screen displayed on the browser screen 800 showing the HTTP response received on the image processing apparatus 110 from the server 130, with reference to FIG. 14.

FIG. 14 is a view which is useful in explaining an example of a user interface displayed on the operation section 112 shown in FIG. 2. The present example corresponds to a user interface (operation screen) that is displayed via the web browser 209 and UI module 201 of the image processing apparatus 110 with screen information received from the server 130. In other words, this example corresponds to a user interface (operation screen) of the image processing apparatus 110 provided from the server 130 with authentication by the WAS 212 completed. The buttons discussed below also function as buttons for executing an image processing using functions of the server 130.

In FIG. 14, a button 1401 is for allowing the image processing apparatus 100 to scan an original sheet and perform color printing. A button 1402 is for allowing the image processing apparatus 110 to scan an original sheet and perform black and white printing.

A button 1403 is for allowing the image processing apparatus 110 to scan an original sheet, convert the scanned image data into PDF format data, and store the image data converted to the PDF format data into a folder A (logical area) of the data storage area 1106 of the server 130.

A button 1404 is for allowing the image processing apparatus 110 to perform printing of "XXX document.pdf" data stored in the data storage area 1106 of the server 130. These buttons are depressed through the operation section 112 of the image processing apparatus 110 based on the user's operations.

When information on a button pressed on the operation section 112 of the image processing apparatus 110 is transferred to the server 130, the business logic section 1103 of the server 130 activates a logic corresponding to the button.

When the business logic section 1103 activates the logic corresponding to the button, a web service corresponding to a function of the image processing apparatus 110 is called through the web service requestor section 1101 to execute predetermined processings. Because the business logic corresponding to each of the buttons is represented by a script, representation of the scripts enables function buttons of various patterns to be provided. This means that a function button that combines a plurality of functions may be displayed. For instance, a button combining the buttons 1401 to 1404 is possible. The screen shown in FIG. 14 can also be displayed on a display section of the host computer 120. As a specific procedure, the host computer 120 first transmits to the server 130 information such as a user ID and a password input by the user via the Web browser 120A, at the time of accessing to the server 130. Based on the transmitted information, i.e., the user ID and the password, the server 130 makes the authentication server 140 perform authentication. If the authentication is successful, the server 130 transmits such a screen as shown in FIG. 14 to the Web browser 120A of the host computer 120 for display thereon. The user then uses the buttons 1401 to 1404 shown on the displayed screen to give instructions to the image processing apparatus 110. Thus, instructions can be also provided from the host computer 120 to the image processing apparatus 110.

A detailed description will be given of a case where the button 1401 is depressed by the user on the operation section 112 of the image processing apparatus 110 in the user interface (operation screen) shown in FIG. 14.

In FIG. 12B, when the button 1401 displayed on the operation section 112 of the image processing apparatus 110 is depressed by the user, a depression event for the button 1401 is transferred from the UI module 201 to the web browser module 209 (step S1220). In the step S1220, such a display control as to display buttons corresponding to the authenticated user information is executed, resulting in the user interface (operation screen) shown in FIG. 14 being displayed.

Then, in step S1221, an HTTP request of the PUT method indicating that the button 1401 has been depressed is transmitted from the web browser module 209 to the server 130 through the HTTP module 214.

Next, in step S1222, the web server section 131 of the server 130 receives the HTTP request of indicating the button 1401 being depressed at the image processing apparatus 110. The web server section 131 then requests the business logic section 1103 to perform a logic processing corresponding to the button 1401 depressed.

In the step S1223, the business logic section 1103 retrieves a script corresponding to the button from the program management area 1105 and requests script processing from the script engine section 1102.

Then, in step S1224, the script engine section 1102 reads details of processing and setting information or the like for the image processing apparatus 110 from the contents of the script and returns them to the business logic section 1103.

In step S1225, the business logic section 1103 of the server 130 performs to the image processing apparatus 110 an authentication processing of utilizing a function of the image processing apparatus 110 using a web service, from the web service requestor section 1101.

It should be noted that steps S1226 to S1230 can be omitted if the server 130 transmits the ST held therein.

In step S1226, the WAS 212 of the image processing apparatus 110 transmits Credentials received from the server 130 to the authentication server 140. In step S1227, the authentication server 140 performs user authentication with the Credentials received from the WAS 212 of the image processing apparatus 110. Then, the authentication server 140 determines whether or not the Credentials received from the WAS 212 of the image processing apparatus 110 are successful in authentication. If the authentication server 140 determines that the user authentication is successful, the program proceeds to step S1229.

On the other hand, if the authentication server 140 determines that the Credentials received from the WAS 212 are not valid in the step S1227, the authentication server 140 returns the authentication failure to the WAS 212 of the image processing apparatus 110.

Then, in step S1228, the WAS 212 of the image processing apparatus 110 returns the authentication failure to the server 130, followed by the program proceeding to step S1225 which is performed on the server 130.

On the other hand, if the authentication server 140 determines that the credentials received from the WAS 212 are valid in the step S1227, the authentication server 140 issues the ST corresponding to the Credentials in step S1229. Then, in step S1230, the authentication server 140 returns the ST back to the WAS 212 of the image processing apparatus 110.

In step S1231, the WAS 212 of the image processing apparatus 110 again makes an inquiry to the authentication server 140 with the ST received from the authentication server 140 as a key and obtains the user information.

In step S1232, the ACM 206 creates an authentication context from the ST received from the authentication server 140 and the user information obtained from the authentication server 140, and saves the context in the RAM 302.

In step S1233, if the authentication is successful, the business logic section 1103 of the server 130 executes scripts returned from the script engine section 1102 in sequence. In this instance, the ST and the HTTP request for a scanning request web service are transmitted to the image processing apparatus 110.

In step S1234, the WAS 212 of the image processing apparatus 110 receives the ST and scan request from the server 130.

In step S1235, the WAS 212 determines whether or not the authentication context created in the step S1207 via a local authentication service and the authentication context created in the step S1232 via a web service agree with each other. A manner of determining that the contexts agree with each other may include a method of making a comparison with respect to any one of the ST attribute 905, the user name attribute 906, the user ID attribute 907, the group name attribute 908, the group ID attribute 909, the domain name attribute 910, and the mail address attribute 911. It should be noted that a comparison method of combining these attributes may also be employed.

As a result of the determination of the step S1235, if the WAS 212 determines that the authentication context created via the local authentication service and the authentication context created via the web service do not agree with each other, the WAS 212 returns an error to the server 130 in step S1336. Then, in step S1237, the business logic section 1103 of the server 130 stores in the preference data area 1107 the fact that the processing is failed, followed by the program terminating. In this instance, the business logic section 1103 of the server 130 stores any remaining processing task in the preference data area 1107 with the task associated with the user information.

On the other hand, as a result of the determination of the step S1235, if the WAS 212 determines that the authentication context created via the local authentication service and the authentication context created via the web service agree with each other, the program proceeds to step S1238. In this instance, if the WAS 212 determines that there is no authentication context created via the local authentication service, the program proceeds to step S1238.

In the step S1238, a scanning web service of the WAS 207 is called, and then, in step S1239, if scan settings have not been made in the scan web service call, a scan setting screen is displayed for the user on the operation section 112 and the user is prompted to make scan settings.

However, if the scan setting has been made in the scanning web service call, the step S1239 is omitted.

In step S1240, the user puts a sheet document on the scanner 113 to allow the scanner 113 carry out scanning. It should be noted that when an automatic document feeder (ADF) is connected to the scanner 113, the scanning may be carried out using the ADF.

Then, in step S1241, the scanner 113 reads an image of a sheet document that is fed or placed, and then, in step S1242, the printer 114 executes a printing process according to image data that has been read, followed by the program terminating.

By implementing a user interface on an external apparatus such as the server 130 as described above, there is an advantage that implementation of software is easier than when a user interface is implemented on the image processing apparatus 110. This is because, to implement a user interface for the image processing apparatus 110, one has to be familiar with a programming method specific to the image processing apparatus 110, whereas to implement a user interface on the server 130, one need only to be able to implement software for Web applications.

In addition, as described above, a first authentication context generated at the time of user authentication from the operation section 112 of the image processing apparatus 110 is compared by the WAS 212 with a second authentication context generated upon user authentication performed via a web service request from a network. And if the WAS 212 determines that the first and second authentication contexts do not agree with each other, a web service request is not accepted from the network. This can prevent spoofing and allow the user who is manipulating the operation section 112 of the image processing apparatus 110 to carry out scan and printing services.

By way of example, assume that a third party who has not input a Credential through the operation section 112 of the image processing apparatus 110 accesses the server 130 via a network and makes a scan request to the image processing apparatus 110 through an operation screen of the server 130. In that case, a correct ST is not given to the scan request sent from the server 130 to the image processing apparatus 110, so that scanning based on the scan request will not be executed on the image processing apparatus 110. On the other hand, for a user who has input a credential from the operation section 112 of the image processing apparatus 110, a valid ST is given to a scan request made from the operation section 112 of the image processing apparatus 110, so that a processing will be carried out based on the scan request. Through such control, it is possible to prevent such a situation in which a scan request made by a third party is accepted with a document set on the scanner 113 by the user and a scanning process not requested by the user who has set the document is performed.

Thus, a web service request is not executed even if the user is authenticated on the server 130 unless an authentication context created via a local authentication service agrees with an authentication context created via a web service.

It should be noted that while the present embodiment is described by illustrating a case where the image processing apparatus 110 receives a scan request from the server 130 and executes a scanning or reading processing, the request may be for processing other than scanning. For example, it may be a request for printing data stored in the HDD 304 or other way of processing. In addition, the present embodiment is also described for a case where the server 130 sends a user interface and an instruction given by the user via the user interface is sent from the image processing apparatus 110 to the server 130, and the instruction is directly received by the server 130. However, the transmitted instruction may also reach the server 130 by way of an apparatus other than the server 130.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-286256, filed Nov. 7, 2008, which is hereby incorporated by reference herein in its entirety.

What is claimed is:

1. A data processing apparatus comprising:
a web browser that displays an operation screen provided by a server; and
a processor and a memory configured to:
store a first authentication information which is stored when a user logs in to the data processing apparatus and is deleted when the user logs out of the data processing apparatus, the first authentication information indicating the user;
transmit to the server an instruction accepted via the operation screen;
receive from the server process execution request created based on the instruction transmitted to the server;
determine whether or not a second authentication information specified based on the process execution request-related information transmitted by the server matches with the first authentication information, the second authentication information indicating a user; and
cause a process according to the process execution request to be executed when it is determined that the second authentication information matches with the first authentication information, and to cause the process according to the process execution request not to be executed when it is not determined that the second authentication information matches with the first authentication information.

2. The data processing apparatus according to claim 1, wherein the processor and memory are further configured to read an image of an original document,
wherein a reading processing is performed based on the process execution request.

3. The data processing apparatus according to claim 1, wherein the processor and memory are further configured to transfer an error to the server in a case where it is determined that the second authentication information does not match with the first authentication information.

4. The data processing apparatus according to claim 1, wherein the processor and memory are further configured to accept an input of user information,
wherein the first authentication information is generated based on the accepted user information.

5. The data processing apparatus according to claim 4, wherein the processor and memory are further configured to obtain an authentication token generated based on the accepted user information,
wherein the first authentication information is generated based on the obtained authentication token.

6. The data processing apparatus according to claim 5, wherein the processor and memory are further configured to transmit to the server the obtained authentication token before receiving the operation screen from the server.

7. The data processing apparatus according to claim 5, wherein the authentication token issued by an authentication server communicating with the data processing apparatus is obtained via a network.

8. The data processing apparatus according to claim 5, wherein the processor and memory are further configured to transfer to the server the user information inputted through an operation screen displayed by the Web browser,
wherein the information transmitted by the server is the transmitted user information.

9. The data processing apparatus according to claim 1, wherein the first authentication information and the second authentication information are capable of identifying the user.

10. A method of controlling a data processing apparatus including a web browser that displays an operation screen provided by a server, the method comprising the steps of:
storing a first authentication information which is created when a user logs in to the data processing apparatus and is deleted when the user logs out of the data processing apparatus, the first authentication information indicating the user;
transmitting to the server an instruction accepted via the operation screen;
receiving from the server a process execution request created based on the instruction transmitted to the server;
determining whether or not a second authentication information specified based on the process execution request-related information transmitted by the server matches with the first authentication information, the second authentication information indicating a user; and
causing a process according to the process execution request to be executed when it is determined at the determining step that the second authentication information matches with the first authentication information, and causing the process according to the process execution request not to be executed when it is not determined at the determining step that the second authentication information matches with the first authentication information.

11. A non-transitory computer-readable storage medium storing a program for causing a computer to execute a method of controlling a data processing apparatus including a web browser that displays an operation screen provided by a server, the method comprising the steps of:
storing a first authentication information which is created when a user logs in to the data processing apparatus and is deleted when the user logs out of the data processing apparatus, the first authentication information indicating the user;
transmitting to the server an instruction accepted via the operation screen;
receiving from the server a process execution request created based on the instruction transmitted to the server;
determining whether or not a second authentication information specified based on the process execution request-related information transmitted by the server matches with the first authentication information, the second authentication information indicating a user; and
causing a process according to the process execution request to be executed when it is determined at the determining step that the second authentication information matches with the first authentication information, and causing the process according to the process execution request not to be executed when it is not determined at the determining step that the second authentication information matches with the first authentication information.

* * * * *